(12) United States Patent
Kristen

(10) Patent No.: US 9,732,832 B2
(45) Date of Patent: Aug. 15, 2017

(54) LINEAR ACTUATOR

(71) Applicant: Limoss US, LLC, Baldwyn, MS (US)

(72) Inventor: Martin Kristen, Baldwyn, MS (US)

(73) Assignee: Limoss US, LLC, Baldwyn, MS (US)

( * ) Notice: Subject to any disclaimer, the term of this patent is extended or adjusted under 35 U.S.C. 154(b) by 536 days.

(21) Appl. No.: 14/445,432

(22) Filed: Jul. 29, 2014

(65) Prior Publication Data

US 2015/0033538 A1 Feb. 5, 2015

Related U.S. Application Data

(60) Provisional application No. 61/862,409, filed on Aug. 5, 2013.

(51) Int. Cl.
| | | |
|---|---|---|
| *F16H 25/18* | (2006.01) | |
| *F16H 25/16* | (2006.01) | |
| *F16H 25/20* | (2006.01) | |
| *A47C 20/04* | (2006.01) | |
| *A47C 1/024* | (2006.01) | |

(52) U.S. Cl.
CPC ........... *F16H 25/18* (2013.01); *A47C 1/0242* (2013.01); *A47C 1/0246* (2013.01); *A47C 20/041* (2013.01); *A47C 20/042* (2013.01); *F16H 25/16* (2013.01); *F16H 25/20* (2013.01); *F16H 2025/204* (2013.01); *F16H 2025/2031* (2013.01); *F16H 2025/2043* (2013.01); *Y10T 29/49826* (2015.01); *Y10T 74/18576* (2015.01)

(58) Field of Classification Search
CPC .. F16H 25/18; F16H 25/20; F16H 2025/2031; F16H 2025/2034; F16H 2025/204; F16H 2025/2043; A47C 20/041; A47C 20/042; A47C 20/0242; A47C 20/0246
USPC .................... 74/89.23; 310/12.33, 12.27, 89; 403/242, 253, 282
See application file for complete search history.

(56) References Cited

U.S. PATENT DOCUMENTS

| | | | | |
|---|---|---|---|---|
| 1,736,878 | A * | 11/1929 | Duvall | F16B 12/58 |
| | | | | 5/299 |
| 4,696,512 | A * | 9/1987 | Burnett | A47C 1/035 |
| | | | | 297/330 |
| 6,637,095 | B2 * | 10/2003 | Stumpf | B29C 66/81423 |
| | | | | 156/293 |
| 2008/0210029 | A1 | 9/2008 | Wang | |
| 2009/0199667 | A1 | 8/2009 | Menjak | |
| 2015/0208805 | A1* | 7/2015 | Griggs, Jr. | A47C 1/0355 |
| | | | | 297/463.1 |

FOREIGN PATENT DOCUMENTS

| | | |
|---|---|---|
| WO | WO 2004/032684 | 4/2004 |
| WO | WO 2012/083951 | 6/2012 |

\* cited by examiner

*Primary Examiner* — Burton Mullins
(74) *Attorney, Agent, or Firm* — Kilpatrick Townsend & Stockton LLP

(57) ABSTRACT

A method of attaching the adjustment mechanism of a linear actuator with the drive assembly of the linear actuator without the use of traditional assembly techniques such as threaded fasteners, welds or rivets, so that when the adjustment mechanism and drive assembly are aligned and assembled, they lock together.

3 Claims, 3 Drawing Sheets

LINEAR ACTUATOR

Cross-Reference to Related Applications

| | | |
|---|---|---|
| — | — | Kristin |
| 61-862409 | August, 2013 | Kristin |

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

FIELD OF THE INVENTION

A linear actuator is an actuator that creates motion in a straight line, which is widely used within the area of adjustable furniture, where they are used to adjust the position of adjustable furniture such as the lifting and reclining of motion chairs, the height of a table, or the position of the mattress surface of a bed. The linear actuator is typically comprised of a reversible drive assembly, an adjustment mechanism and a linkage assembly. The linear actuator is attached to a piece of adjustable furniture with a rear mounting bracket and a linkage assembly. The rear mounting bracket ensures that linear actuator does not move, while the linkage assembly facilitates the adjustment of the furniture.

The adjustment mechanism facilitates the adjustment of the adjustable furniture by extending or retracting an outer casing or by the movement of a pusher block along the outer structure of the adjustment mechanism.

The present disclosure reveals a means of attaching the adjustment mechanism of the linear actuator to the drive assembly without the means of traditional assembly techniques such as threaded fasteners, welds or rivets so that when aligned and joined, the adjustment mechanism and the drive assembly are locked together. The new disclosure reduces manufacturing time.

BACKGROUND OF THE INVENTION

Prior art for the method of assembling linear actuators, in particular, the method of attaching the drive assembly with the adjustment mechanism involves the use of a plurality of fastening means including but not limited to threaded fasteners. The present disclosure reveals a method of attaching the drive assembly with the adjustment mechanism without the use of traditional fastening techniques such as threaded fasteners, welds or rivets.

The arrangement for the linear actuator comprises an adjustment mechanism and drive assembly wherein the adjustment mechanism and the drive assembly are attached by a plurality of locking means and a plurality of slots, where the plurality of slots, and the locking means can be aligned and joined, locking the adjustment mechanism and drive assembly together.

Several attempts have been made to develop a method for attaching the drive assembly of a linear actuator to the adjustment mechanism, which are addressed individually below.

In U.S. Pat. App. 2011/0298323, Brieschke discloses a linear actuator where the motor and linear actuator apparatus are attached by a plurality of thru-holes through which treaded fasteners are passed, whereas the present disclosure reveals that the drive assembly and adjustment mechanism are assembled without the use of threaded fasteners.

In U.S. Pat. No. 7,066,041, Nielsen discloses a linear actuator where the outer housing is welded together in order to save time, whereas the present disclosure reveals that the drive assembly can be attached to the adjustment mechanism without the use of welds.

In U.S. Pat. App. 2009/199667, Menjak et al., discloses a linear actuator wherein the motor is attached to the torque transmission device with a pair of motor fasteners and further discloses that the motor could be attached to the torque transmission device in some other manner, whereas the present disclosure reveals that the adjustment mechanism and the drive assembly are attached without the use of traditional assembly techniques, which is not identified in Menjak, nor was the presently disclosed method of attachment common in the industry when Menjak was filed.

In WO 2012/083951, Iversen et al., discloses a method of aligning the base unit console with the motor housing with the use of a tongue and groove process wherein the tongue and groove combination is located on the joining surface of the base unit console and motor housing, and further discloses that the tongue and groove identified is for the purpose of seal and does not disclose that the tongue and groove combination actually attaches the base unit console to the motor housing, whereas the present disclosure reveals that the adjustment mechanism and the drive assembly are attached without the use of traditional assembly methods.

In WO 2004/032684, Roither et al., discloses a linear actuator where the motor assembly and drive train could be attached by means of snap hooks that attach to bore holes, wherein snap hooks are spring-loaded self-enclosed hooks wherein a portion of the closed loop system opens to allow the snap hook to be attached to a bore hole and once released, the spring repositions the openable portion of the closed loop system, whereas the present disclosure reveals a method of assembly that does not include snap hooks.

In U.S. Pat. App. 2008/210029, Wang discloses a linear actuator wherein the linear actuator can be quickly disassembled with the use of a threaded fast-releasing device, whereas the present disclosure reveals a method of attaching the adjustment mechanism and the drive assembly without the use of threaded fasteners.

SUMMARY OF THE INVENTION

The present disclosure reveals a linear actuator comprising an adjustment mechanism and a drive assembly wherein the adjustment mechanism and drive assembly are assembled together without the use of traditional fastening means such as screws, welds or rivets.

The linear actuator comprising a means of assembly of the adjustment mechanism with the drive assembly by means of a plurality of prongs, wherein the plurality of prongs comprises a raised portion with a front face and a back edge, wherein the plurality of prongs extend from one of the parts and a plurality of slots located on the other part, where the plurality of prongs and the plurality of slots can be aligned and joined, locking the adjustment mechanism and drive assembly together.

In the first embodiment of the linear actuator wherein, as part of the structure of the drive assembly there are a plurality of prongs and a plurality of slots on the adjustment mechanism. The positioning of the plurality of slots on the adjustment mechanism align with the plurality of prongs on the drive assembly. The adjustment mechanism and the drive assembly are attached to each other when the plurality of slots of each of the adjustment mechanism are aligned with the plurality of prongs of the drive assembly.

In the second embodiment of the linear actuator, as part of the structure of the drive assembly there are a plurality of slots and there are a plurality prongs on the adjustment mechanism. The positioning of the plurality of prongs on the adjustment mechanism align with the plurality of slots on the drive assembly. The adjustment mechanism and the drive assembly are attached to each other when the plurality of locking means of the adjustment mechanism are aligned with the plurality of slots of the drive assembly.

DETAILED DESCRIPTION OF THE INVENTION

Figure 1:
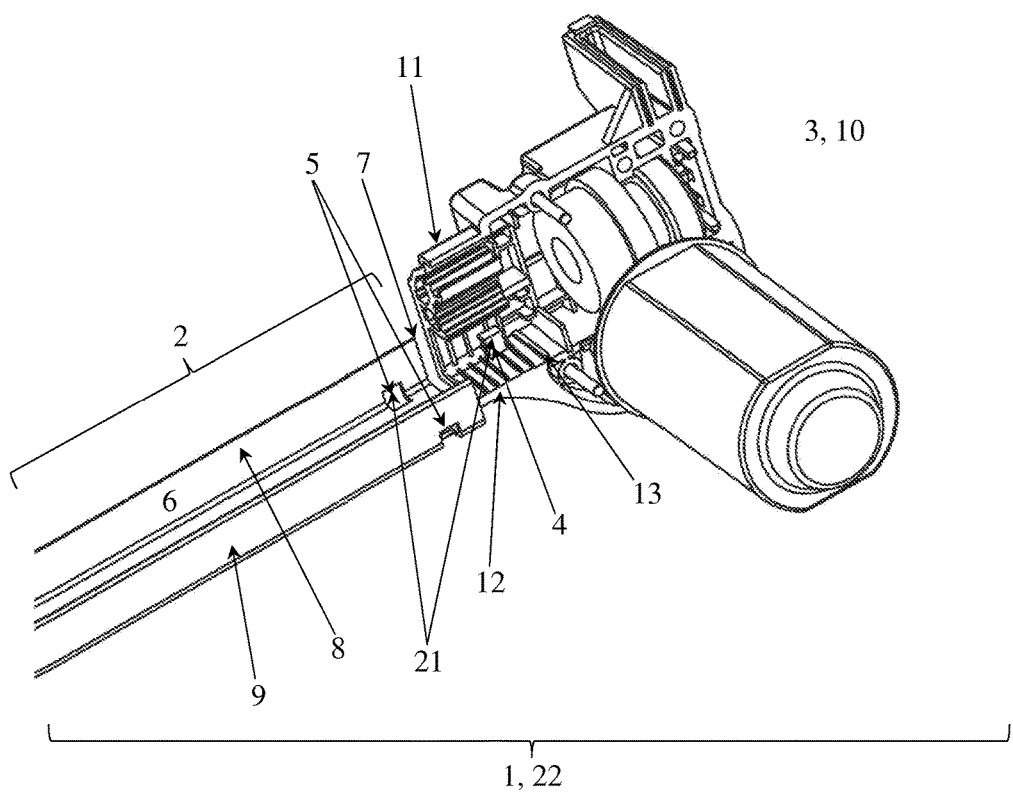
FIG. 1 is an objective view of the disassembled drive assembly and adjustment mechanism with the drive assembly displaying the first preferred embodiment of the linear actuator with a plurality of prongs on the drive assembly and the adjustment mechanism displaying a plurality of slots.
Figure 2:
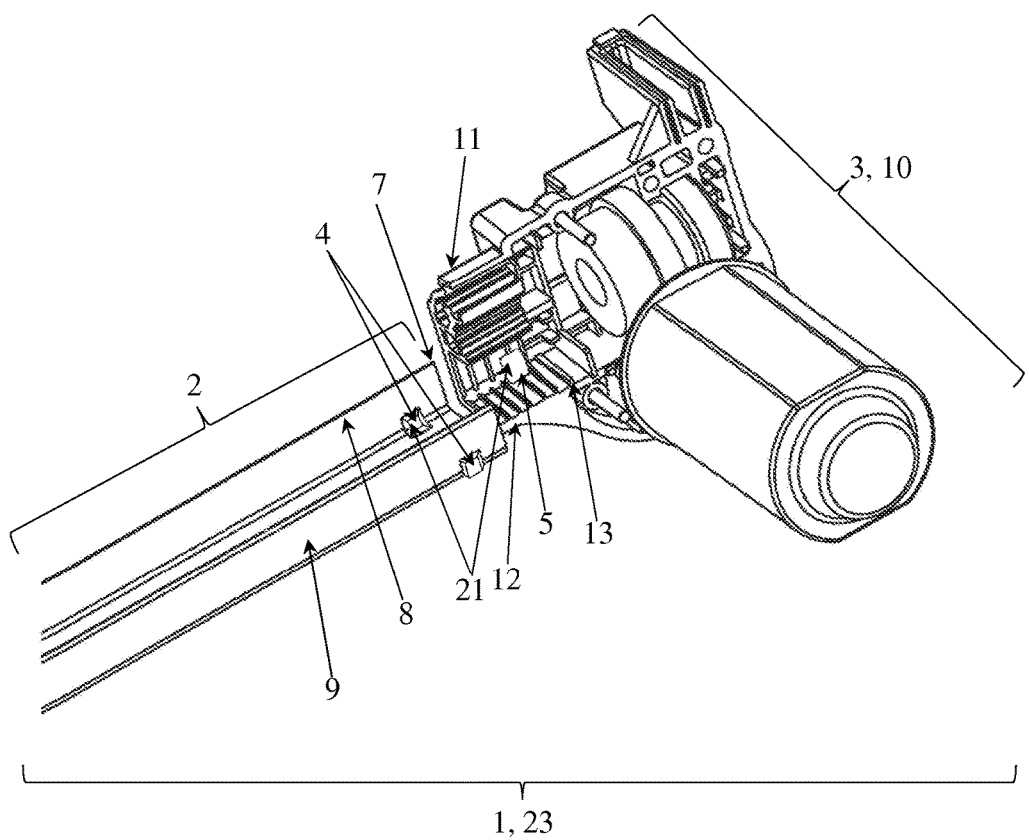
FIG. 2 is an objective view of the disassembled drive assembly and adjustment mechanism with the drive assembly displaying the second preferred embodiment of the linear actuator with a plurality of prongs on the adjustment mechanism and the drive assembly displaying a plurality of slots.
Figure 3A:
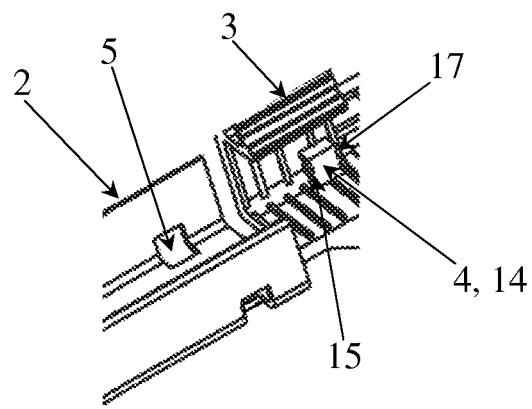
FIG. 3A is an objective view of an example of the plurality of prongs and plurality of slots before the prong is locked into the slot.
Figure 3B:
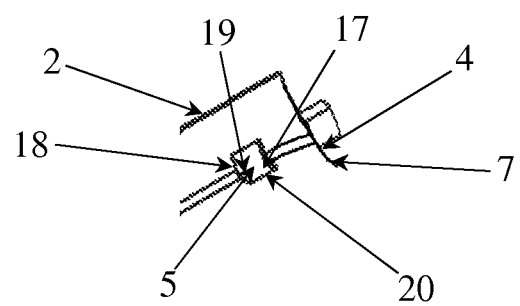
FIG. 3B is an objective view of an example of the plurality of prongs and plurality of slots wherein the raised portion of the prong pushes up the front edge of the adjustment mechanism, indicating how the raised portion displaces the front edge to allow the prong and slot to fit together.
Figure 3C:
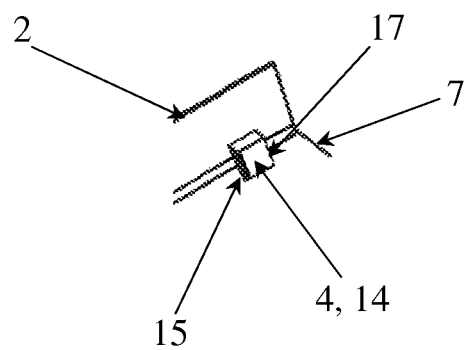
FIG. 3C is an objective view an example of the plurality of prongs and plurality of slots indicating how the prong locks into place in the slot.

The linear actuator 1 comprises an adjustment mechanism 2 and drive assembly 3 wherein the adjustment mechanism 2 and the drive assembly 3 are attached by a plurality of prongs 4, a plurality of slots 5. The adjustment mechanism 2 has a main structure 6, front edge 7, left side 8 and right side 9. The drive assembly 3 has main body 10, a left side 11, a right side 12 and an attachment edge 13.

Each prong 4 of the plurality of prongs 4 comprises a raised portion 14 with a front face 15 and a back edge 16. Each slot of the plurality of slots has a front edge 17, a back edge 18, a top edge 19, and a bottom edge 20. The front face 15 of each prong 4 is shaped so as to facilitate the adjustment mechanism 8 and the drive assembly 3 being adjusted so that the prong 4 and associated slot 5 can align. The slot 5 is the size of the prong 4 to which it will be aligned so that when the slot 5 is positioned over the prong 4 the prong 4 fits into the slot 5.

As the adjustment mechanism 8 and the drive assembly 3 are moved together, the prong 4 and associated slot 5 is adjusted until the back edge 16 of the prong 4 is past the front edge 17 of the slot 5, at which point the prong 4 enters the slot 5 and the slot 5 and prong 4 become locked.

The plurality of prongs 4 and the plurality of slots 5 are positioned such that, the plurality of slots 5 are aligned with the corresponding plurality of prongs 4 at the same time the front edge 7 of the adjustment mechanism 8 is in contact with the attachment edge 13 of the drive assembly 3.

Contact between the front edge 7 of the adjustment mechanism 8 and the attachment edge 13 of the drive assembly 3 prevents the adjustment mechanism 8 and drive assembly 3 from moving closer together. The prong 4 of each of the plurality of prongs 4 being aligned with the corresponding plurality of slots 5 prevents the adjustment mechanism 8 from being pulled away from the drive assembly 3. The front edge 17 of the slot 5 is shaped so that it prevents the back edge 16 of the prong 4 from being pulled back out of the slot 4. The shape of the top edge 19 of each slot 5 of the plurality of slots 5 prevents the prong 4 being moved upward. The shape of the bottom edge 20 of each slot 5 of the plurality of slots 5 prevents the prong 4 from being moved downward.

A prong 4 and the corresponding slot 5 make up an assembly set 21. At a minimum, there are two assembly sets 21 that hold the adjustment mechanism 8 together with the drive assembly 3. One assembly set 21 is attached to the left side 8 of the adjustment mechanism 8 and the left side 11 of the drive assembly 3. The second assembly set 21 is attached to the right side 9 of the adjustment mechanism 8 and the right side 12 of the drive assembly 3. Because one assembly set 21 is on the left side 8 of the adjustment mechanism 8 and the left side 11 of the drive assembly 3 and the second assembly set 21 is on the right side 9 of the adjustment mechanism 8 and the right side 12 of the drive assembly 3, they are opposed to each other. The opposing positions of the pair of assembly sets 21 prevents the attachment mechanism 8 from being shifted laterally away from the drive assembly 3. The plurality of prongs 4 being aligned into the corresponding plurality of slots 5 then result is the adjustment mechanism 8 and drive assembly 3 becoming joined.

The first embodiment 22 of the linear actuator 1 wherein, as part of the structure of the drive assembly 3, there are a plurality of slots 5 located in the area of the attachment edge 13 of the drive assembly 3 and in the area of the front edge 7 of the adjustment mechanism 8 there are a plurality of locking means 4. The positioning of the plurality of locking means 4 on the adjustment mechanism 8 align with the plurality of slots 5 on the drive assembly 3. The adjustment mechanism 8 and the drive assembly 3 are attached to each other when the plurality of locking means 4 of the adjustment mechanism 8 are aligned with the plurality of slots 5 of the drive assembly 8.

The second embodiment 23 of the linear actuator 1 wherein, as part of the structure of the drive assembly 3, there are a plurality of locking means 4 located in the area of the attachment edge 13 of the drive assembly 3 and in the area of the front edge 7 of the adjustment mechanism 8 there are a plurality of slots 5. The positioning of the plurality of slots 5 on the adjustment mechanism 8 align with the plurality of locking means 4 on the drive assembly 3. The adjustment mechanism 8 and the drive assembly 3 are attached to each other when the plurality of slots 5 of each of the adjustment mechanism 8 are aligned with the plurality of locking means 4 of the drive assembly 3.

What is claimed:

1. A linear actuator for use with adjustable furniture comprising:
   an adjustment mechanism and drive assembly;

wherein the adjustment mechanism and the drive assembly are attached by a plurality of prongs and a plurality of slots;

wherein the adjustment mechanism comprise a main structure, front edge, left side and right side;

wherein the drive assembly comprise a main body, a left side, a right side and an attachment edge;

wherein each prong of the plurality of prongs comprises a raised portion with a front face and a back edge;

wherein each slot of the plurality of slots comprises a front edge, a back edge, a top edge and a bottom edge;

wherein a front face of each prong is shaped so as to facilitate the adjustment mechanism and the drive assembly being adjusted so that the prong and associated slot can align;

wherein the slot is the size of the prong to which it will be aligned so that when the slot is positioned over the prong the prong fits into the slot;

wherein, as the adjustment mechanism and the drive assembly are moved together, the prong and associated slot is adjusted until the back edge of the prong is past the front edge of the slot, at which point the prong enters the slot and the slot and prong are locked;

wherein the plurality of prongs and the plurality of slots are positioned such that, the plurality of slots are aligned with the corresponding plurality of prongs at the same time the front edge of the adjustment mechanism is in contact with the attachment edge of the drive assembly;

wherein, contact between the front edge of the adjustment mechanism and the attachment edge of the drive assembly prevents the adjustment mechanism and drive assembly from moving closer together;

wherein the prong of each of the plurality of prongs being aligned with and just beyond the back edge of each of the corresponding plurality of slots prevents the adjustment mechanism from being pulled away from the drive assembly;

wherein the front edge of the slot is shaped so that it prevents the back edge of the prong from being pulled back out of the slot;

wherein a shape of the top edge of each slot of the plurality of slots prevents the prong being moved upward;

wherein a shape of the bottom edge of each slot of the plurality of slots prevents the prong from being moved downward;

wherein a prong and the corresponding slot comprise an assembly set;

wherein, at a minimum, there are two assembly sets that hold the adjustment mechanism together with the drive assembly;

wherein, one assembly set is attached to the left side of the attachment mechanism and the left side of the drive assembly;

wherein the second assembly set is attached to the right side of the attachment mechanism and the right side of the drive assembly;

wherein, because assembly set is on the left side of the adjustment mechanism and the left side of the drive assembly and the second assembly set is on the right side of the adjustment mechanism and the right side of the drive assembly, they are opposed to each other;

wherein, the opposing positions of the pair of assembly sets prevents the attachment mechanism from being shifted laterally away from the drive assembly; and wherein the plurality of prongs being locked into the corresponding plurality of slots then result in the adjustment mechanism and drive assembly becoming joined.

2. The linear actuator of claim 1 wherein, as part of the structure of the drive assembly, there are a plurality of slots located in the area of the attachment edge of the drive assembly and in the area of the front edge of the adjustment mechanism there are a plurality of prongs;

wherein the positioning of the plurality of prongs on the adjustment mechanism align with the plurality of slots on the drive assembly; and wherein the adjustment mechanism and the drive assembly are attached to each other when the plurality of prongs of the adjustment mechanism are aligned with the plurality of slots of the drive assembly.

3. The linear actuator of claim 1 wherein, as part of the structure of the drive assembly, there are a plurality of prongs located in the area of the attachment edge of the drive assembly and in the area of the front edge of the adjustment mechanism there are a plurality of slots;

wherein the positioning of the plurality of slots on the adjustment mechanism align with the plurality of prongs on the drive assembly; and wherein the adjustment mechanism and the drive assembly are attached to each other when the plurality of slots of each of the adjustment mechanism are aligned with the plurality of prongs of the drive assembly.

\* \* \* \* \*